United States Patent Office.

HENRY T. PAYNE AND WILLIAM AYRES, OF SAN FRANCISCO, CALIFORNIA.

Letters Patent No. 73,377, dated January 14, 1868.

IMPROVED FINISH FOR PAINTED SURFACES.

The Schedule referred to in these Letters Patent and making part of the same.

TO ALL WHOM IT MAY CONCERN:

Be it known that we, HENRY T. PAYNE and WILLIAM AYRES, of the city and county of San Francisco, State of California, have invented a new and useful Crude Galena Finish for Paints; and we do hereby declare that the ingredients used in making or producing said paint-finish, and the manner of applying the same for obtaining the desired object, are described in the following specification.

The object of our invention is to provide an improved finish for paint, either for the outside or inside of buildings, or for signs, and other places where smalt or sand is often used as a finish for the paint.

This we do by first laying on the paint of any desired color; the pulverized galena is then applied by hand, as desired. The galena used is the ordinary ore of lead, and must be perfectly free from foreign substances, in order that it may be properly applied, and present a beautiful appearance. The building, sign, or other article to which the finish is to be applied, is first coated with paint as often as desired, and of any suitable color. The last coat may be made considerably thicker than when prepared for ordinary use. The galena is pulverized to about the size of cracked wheat or coarse sand, when it is applied by hand, being thrown against the painted surface before it is dry, so as to imitate variegated marble, or any stone desirable, which can be done, by a little practice, by any one skilled in the art. The adhesive coat of paint last applied retains the galena wherever it strikes the surface. Any surface so treated, will present a brilliant finish, especially in the sun, from the reflection of the innumerable minute faces of the galena, while, with skill, it may be made to imitate building-stone so closely as not to be detected at a little distance from it, thus forming a beautiful and clear finish.

Having thus described our invention, what we claim as new, and desire to secure by Letters Patent, is—

A finish for paint, consisting of crude galena, prepared and applied substantially as and for the purpose herein described.

In witness whereof, we have hereunto set our hands and seals.

HENRY T. PAYNE. [L. S.]
WILLIAM AYRES. [L. S.]

Witnesses:
   J. L. BOONE,
   C. W. M. SMITH.